United States Patent

Seyfang

[11] Patent Number: 5,913,808
[45] Date of Patent: *Jun. 22, 1999

[54] TURBINE ENGINE INTAKE WITH GAS MIXER

[75] Inventor: George R. Seyfang, Warton, United Kingdom

[73] Assignee: British Aerospace Public Limited Company, Farnborough, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/845,355

[22] Filed: Apr. 24, 1997

Related U.S. Application Data

[63] Continuation of application No. 08/598,328, Feb. 8, 1996, abandoned.

[30] Foreign Application Priority Data

Feb. 9, 1995 [GB] United Kingdom ............... 9502539

[51] Int. Cl.⁶ ............................................. F02D 7/04
[52] U.S. Cl. ......................................... 60/39.33; 137/15.1
[58] Field of Search ................ 80/39.185, 39.33; 137/15.1, 15.2; 415/121.1, 143

[56] References Cited

U.S. PATENT DOCUMENTS

| 2,726,508 | 12/1955 | Halford et al. ............... 415/143 |
| 3,719,428 | 3/1973 | Dettmering ............... 60/39.183 |
| 3,832,086 | 8/1974 | Hull et al. ............... 137/15.1 |

FOREIGN PATENT DOCUMENTS

| 0 201 770 | 11/1986 | European Pat. Off. . |
| 0 385 294 | 9/1990 | European Pat. Off. . |
| 712542 | 7/1954 | United Kingdom . |
| 1 575 130 | 9/1980 | United Kingdom . |
| 2 049 819 | 12/1980 | United Kingdom . |
| 2 250 693 | 6/1992 | United Kingdom . |

Primary Examiner—Louis J. Casaregola
Attorney, Agent, or Firm—Pillsbury Madison & Sutro LLP

[57] ABSTRACT

An inlet gas mixing element for a gas turbine engine, comprising a gas intake duct 10, and downstream of the inlet duct a mixing element 22, the mixing element being so disposed in relation to the inside of the duct so as to rotate thereby urging the forced mixing of the air and other gases moving past the element 22 towards the face of the fan blades of the downstream engine compressor stage 16. The action of the mixing element serves to increase the mixing of new air and other possibly hotter gasses so as to reduce the temperature differential across the face of the engine compressor stages.

3 Claims, 2 Drawing Sheets

TURBINE ENGINE INTAKE WITH GAS MIXER

This is a continuation of application Ser. No. 08/598,328, filed on Feb. 8, 1996, now abandoned.

This invention relates to the field of engine intakes and more specifically to the problems associated with hot gas ingestion due to the re-circulation of exhaust gases when in close proximity to the ground.

One of the potential problems associated with short/vertical take-off and short/vertical landing aircraft is that of the re-circulation of hot exhaust gases during the jet borne landing approach phase of flight. This phenomena occurs due to the fact that hot jet exhaust gases which are directed groundwards during the landing phase may, by virtue of the fact that the aircraft has a low air speed, be deflected in such a way that the said gases are ingested into the forward engine intakes. In aircraft such as the Harrier, with its vertical landing capability, these effects are more pronounced due to the zero ground speed that can be achieved whilst the aircraft is in the hover. During the final hover to descent phase of a Harrier landing, the hot exhaust gases are directed groundwards and by virtue of the multi-directional dispersion characteristics of the said gases the phenomena of hot gas ingestion (HGI) may occur.

From the point of view of aircraft engine performance the phenomenon of HGI may affect the engine performance in one of two ways, namely a reduction of maximum thrust caused by the average rise of inlet air temperature or a surge, leading to sudden loss of thrust, caused by a steady or varying differential of air inlet temperature seen across the face of the engine compressor blades.

The purpose of an aircraft engine intake duct is in some part, to allow the mixing of intake gases such that there is an even temperature distribution across the whole of the intake face at the compressor stage of the engine. One characteristic of gas flow which may induce HGI is that hot engine exhaust gases are drawn towards the aircraft engine intake. Due to the direction from which they are being drawn it is likely that one side or corner of the engine intake face will be presented with an elevated temperature. It has been shown by experimental techniques that by increasing the length of the engine intake duct the mixing of both hot and cold regions of intake gases is increased and as such reduces the temperature differential at the engine compressor face. Unfortunately due to the physical limitations relating to the design of current short and vertical landing aircraft the length of the intake ducts is not a parameter that can be easily tailored to meet the requirement for HGI reduction.

To help reduce this dangerous phenomenon a method of mixing both the hot and cold intake gases during their traverse along the engine intake duct to result in a reduction in the temperature differential shown at the engine face is therefore required.

It is an object of the invention to provide both the apparatus and a method for increasing the mixing of both the hot and cold gases which are drawn into an aircraft engine intake such that a reduced temperature differential across the engine compressor face will result.

According to the invention there is provided apparatus to encourage the mixing of gases in a gas turbine engine intake comprising at least one gas mixing element, said element located at a position between the entrance to the engine intake duct and the compressor face of the engine.

An embodiment of the invention will now be described by way of an example with reference to the following drawings.

Figure 1:
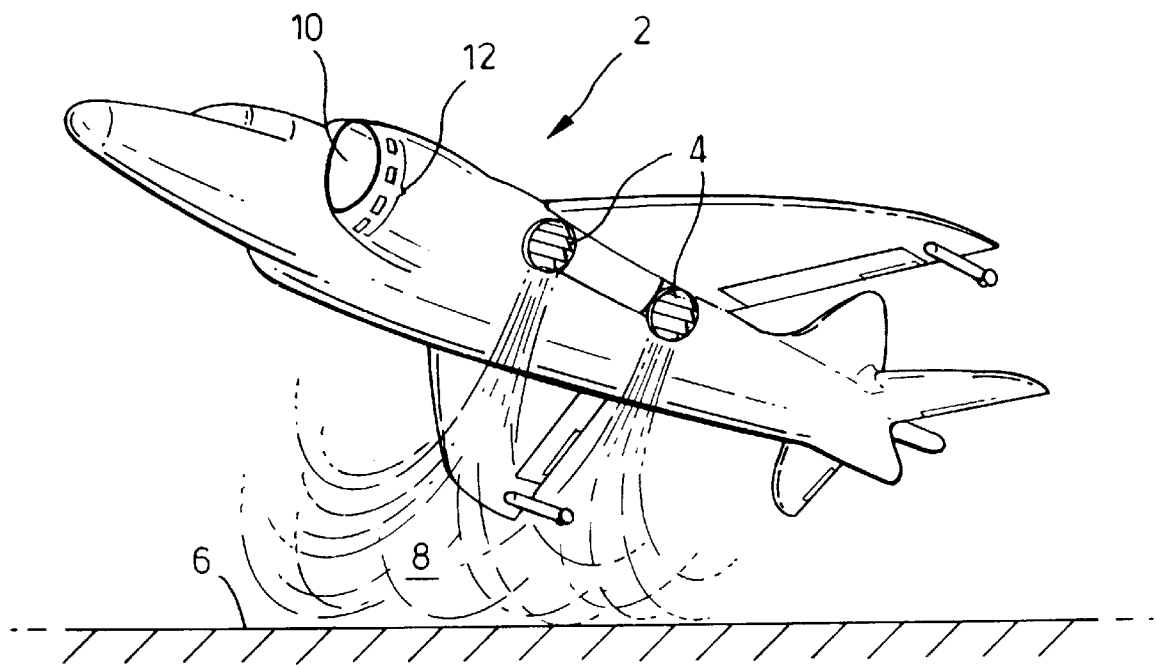
FIG. 1 shows an illustrative diagram of an aircraft conducting a vertical landing.

Referring to FIG. 1, as is common with the majority of fixed wing aircraft able to perform vertical landings, the thrust for such aircraft is able to be directed by the pilot by means of movable exhaust jet nozzles. In FIG. 1, the fixed wing aircraft 2, which is capable of vertical landing, is shown with its directable exhaust jet nozzle 4 in the landing approach configuration with the said exhaust jet being directed towards the ground 6. The jet efflux 8 is shown providing the necessary forces to enable such an aircraft 2 to land vertically and/or hover. With an aircraft 2 in such a landing configuration the primary engine air intake 10 and auxiliary louver door intakes 12 are presented with the problem of ingesting elements of the re-circulated exhaust gases 8.

Figure 2:
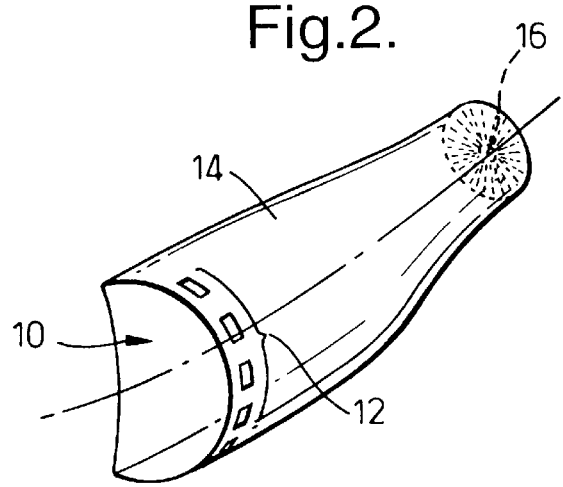
FIG. 2 shows a diagrammatic representation of a gas turbine engined aircraft intake duct.
Figure 3:
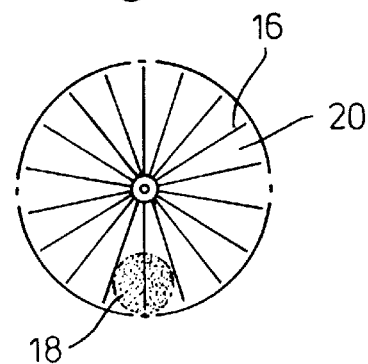
FIG. 3 shows a diagrammatic representation of the temperature profile across the forward compressor fan stage of an engine suffering from HGI.

FIG. 2 shows a cross section of a gas turbine air intake 10 and duct 14 and the associated first stage compressor blades of the engine 16. With an aircraft 2 in the configuration shown in FIG. 1 gases which are drawn through the intake 8 and 10 and along the duct 14 are presented to the face of the first stage compressor blades 16 with a relatively minor amount of temperature mixing en route. FIG. 3 shows a diagrammatic representation of the temperature differential across such a first stage compressor blade assembly 16. The compressor blades 16 although spinning at high RPM are presented with a small area of local high temperature 18 resulting from the ingestion of re-circulated exhaust jet gases. The remaining face of the compressor blade 16 is subjected to a relatively cooler stream of intake gases 20.

Figure 4:
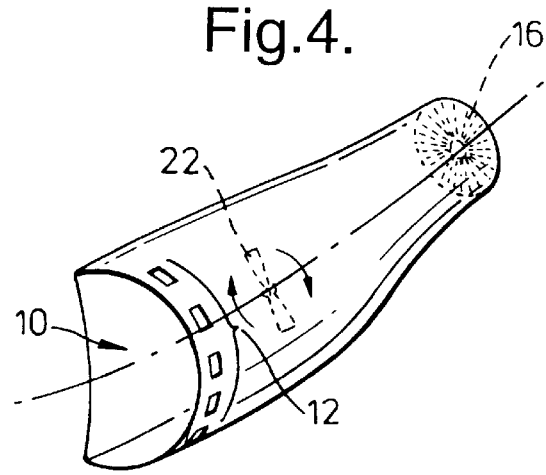
FIG. 4 shows a diagrammatic representation of a gas turbine engine intake in accordance with the invention.

To relieve the associated problems caused by this local hot spot 18 FIG. 4 shows a gas mixer element 22 which is positioned at some point between the engine intake 10 and the first stage compressor blades 16. The gas mixer element 22 preferable has a diameter less than the diameter of the intake duct 14. The object of the mixer element 22 is to encourage the mixing of intake gases along the engine intake duct 14 so as to reduce the magnitude of temperature differentials shown at the first stage compressor blades in FIG. 3. The mechanism by which the mixer element 22 imparts such mixing energy to the intake gases may take a variety of forms. It has been shown by experiment that by utilising at least one aerodynamically profiled blade element in either a fixed stationary, free rotating, or powered rotating configuration correspondingly greater reductions in the temperature differential across the first stage compressor face 16 are obtained.

Due to the nature of gas turbine engine intake design on many aircraft which would benefit from this invention there may be more than one position for air and associated gases to enter the engine ducting system. In such cases additional mixer elements 22 would be located within all associated intake ducts such that a resulting increase in engine performance is achieved despite the effects of hot exhaust gas re-circulation and ingestion.

I claim:

1. An engine intake for mixing intake gases in a gas turbine engine intake duct of a short/vertical take-off/landing aircraft comprising:

a gas turbine engine intake duct having an entrance; and a gas mixing element disposed within the intake duct between the intake duct entrance and a compressor face of an engine, the gas mixing element mixing intake gases along the intake duct so as to reduce temperature differentials across the compressor face, wherein a diameter of the gas mixing element is less than a diameter of the intake duct.

2. An engine intake according to claim 1, wherein the gas mixing element is powered to rotate by means other than an action of intake air being drawn over the gas mixing element.

3. An engine intake according to claim 1, further comprising a plurality of intake ducts and a plurality of gas mixing elements, wherein one of said gas mixing elements is disposed within each of said plurality of intake ducts.

* * * * *